(12) United States Patent
Combes et al.

(10) Patent No.: US 10,934,009 B2
(45) Date of Patent: Mar. 2, 2021

(54) ENGINE ATTACHMENT SYSTEM FOR AN AIRCRAFT ENGINE

(71) Applicant: Airbus Operations SAS, Toulouse (FR)

(72) Inventors: Stéphane Combes, Buzet sur Tarn (FR); Jean Geliot, Toulouse (FR); Thomas Deforet, Toulouse (FR); Adeline Soulie, Garonne (FR); Benoit Orteu, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 316 days.

(21) Appl. No.: 16/180,129

(22) Filed: Nov. 5, 2018

(65) Prior Publication Data

US 2019/0135445 A1    May 9, 2019

(30) Foreign Application Priority Data

Nov. 8, 2017 (FR) ...................... 17 60467

(51) Int. Cl.
*B64D 27/26* (2006.01)

(52) U.S. Cl.
CPC ........ *B64D 27/26* (2013.01); *B64D 2027/266* (2013.01); *B64D 2027/268* (2013.01)

(58) Field of Classification Search
CPC .............. B64D 27/26; B64D 2027/262; B64D 2027/264; B64D 2027/266; B64D 2027/268; B64D 27/12; B64D 27/18
See application file for complete search history.

(56) References Cited

U.S. PATENT DOCUMENTS

| 7,963,480 B2 | 6/2011 | Lafont et al. |
| 2003/0025033 A1* | 2/2003 | Levert ...................... F02C 7/20 244/54 |
| 2009/0266933 A1* | 10/2009 | Foster ..................... F01D 25/28 244/54 |
| 2015/0166188 A1 | 6/2015 | Lin et al. |

FOREIGN PATENT DOCUMENTS

EP    1928740 B1    2/2010

OTHER PUBLICATIONS

French Search Report; priority document.

* cited by examiner

*Primary Examiner* — Joshua J Michener
*Assistant Examiner* — Cindi M Curry
(74) *Attorney, Agent, or Firm* — Greer, Burns & Crain, Ltd.

(57) ABSTRACT

An engine attachment system comprising an engine pylon with a top wall, a bottom wall and two lateral walls, and a front engine attachment with a beam which bears two connecting rods for fixing the engine. The engine attachment system also comprises an intermediate piece with a bottom wall and four lateral walls, wherein the beam is fixed against an outer face of the bottom wall, wherein the intermediate piece is fitted at a front-end face of the engine pylon in such a way that an inner face of the bottom wall comes against the front-end face of the engine pylon, and in such a way that the lateral walls of the intermediate piece are superposed with the walls of the engine pylon. In such an engine attachment system, the front engine attachment is thus located on the front-end face of the engine pylon, allowing a space saving.

6 Claims, 3 Drawing Sheets

ENGINE ATTACHMENT SYSTEM FOR AN AIRCRAFT ENGINE

CROSS-REFERENCES TO RELATED APPLICATIONS

This application claims the benefit of the French patent application No. 1760467 filed on Nov. 8, 2017, the entire disclosures of which are incorporated herein by way of reference.

BACKGROUND OF THE INVENTION

The present invention relates to an engine attachment system for an aircraft engine and an aircraft comprising at least one such engine attachment system.

An aircraft conventionally comprises at least one engine, in particular a jet engine. Under each wing and for each engine, the aircraft comprises an engine pylon which is fixed to the structure of the wing and which extends below the wing and the engine is suspended under the engine pylon.

The engine is fixed to the engine pylon via an engine attachment system comprising a front engine attachment and a rear engine attachment.

The front engine attachment conventionally comprises a beam fixed under the engine pylon and two connecting rods fixed between the beam and a front part of the engine.

Each connecting rod and the beam define, together, a primary path for forces between the engine and the engine pylon to withstand the loads of the engine in normal conditions of operation of the engine.

Currently, the diameter of the engines is tending to increase and the fixing of the engine under the engine pylon can be a factor in slowing down the increase in the diameter for bulk reasons.

SUMMARY OF THE INVENTION

One object of the present invention is to propose an engine attachment system which is not limiting for the dimensions of the engine.

To this end, an engine attachment system is proposed for an engine of an aircraft, the engine attachment system comprising:
   an engine pylon comprising a top wall, a bottom wall and, on each side, a lateral wall, which together delimit a front-end face in the front part of the engine pylon, and
   a front engine attachment comprising a beam to which is fixed, on either side of a median plane, a connecting rod, where each connecting rod is fixed in an articulated manner by one of its ends to the beam and is intended to be fixed in an articulated manner by the other of its ends to the engine,
   the engine attachment system being characterized in that it also comprises an intermediate piece which takes the form of a cup with a bottom wall and four lateral walls which extend around the bottom wall, in that the beam is fixed against an outer face of the bottom wall, in that the intermediate piece is fitted at the front-end face of the engine pylon in such a way that an inner face of the bottom wall comes against the front-end face of the engine pylon, in that a lateral wall of the intermediate piece comes to bear against a lateral wall of the engine pylon, in that another lateral wall of the intermediate piece comes to bear against the other lateral wall of the engine pylon, in that another lateral wall of the intermediate piece comes to bear against the top wall of the engine pylon, in that another lateral wall of the intermediate piece comes to bear against the bottom wall of the engine pylon, and in that each lateral wall of the intermediate piece and the associated wall of the engine pylon are fixed to one another.

In such an engine attachment system, the front engine attachment is thus located on the front-end face of the engine pylon, which allows for a space saving.

According to a particular embodiment, each lateral wall of the engine pylon takes the form of a U that is open towards the interior of the engine pylon and comprises a bottom which constitutes the lateral wall, a first turned edge which extends parallel to the top wall and a second turned edge which extends parallel to the bottom wall, each lateral wall of the engine pylon is positioned between the lateral walls of the intermediate piece, and the top wall and the bottom wall are pressed on the outside against the lateral walls of the intermediate piece.

According to another particular embodiment, each lateral wall of the engine pylon takes the form of a U that is open towards the interior of the engine pylon and comprises a bottom which constitutes the lateral wall, a first turned edge which extends parallel to the top wall and a second turned edge which extends parallel to the bottom wall, each lateral wall of the engine pylon is positioned on the outside of the lateral walls of the intermediate piece, the top wall is pressed on the outside against the lateral wall of the intermediate piece and the first turned edge, and the bottom wall is pressed on the outside against the second turned edge.

Advantageously, each connecting rod, the beam and the intermediate piece together define a primary path for forces between the engine and the engine pylon to withstand the loads of the engine, the engine attachment system comprises, for each connecting rod, a waiting fail-safe fixing point activated in case of failure of the primary path for forces and which creates an auxiliary path for forces between the engine and the engine pylon, and the two waiting fail-safe fixing points are disposed on either side of the median plane.

Advantageously, each waiting fail-safe fixing point consists of a yoke joint produced in the engine and an axis fitted into the yoke joint and which passes through a bore of the beam whose diameter is greater than the diameter of the axis.

The invention also proposes an aircraft comprising a structure, an engine and an engine attachment system according to one of the preceding variants, in which the engine pylon is fixed to the structure, and in which a front part of the engine is fixed to the other ends of the connecting rods.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
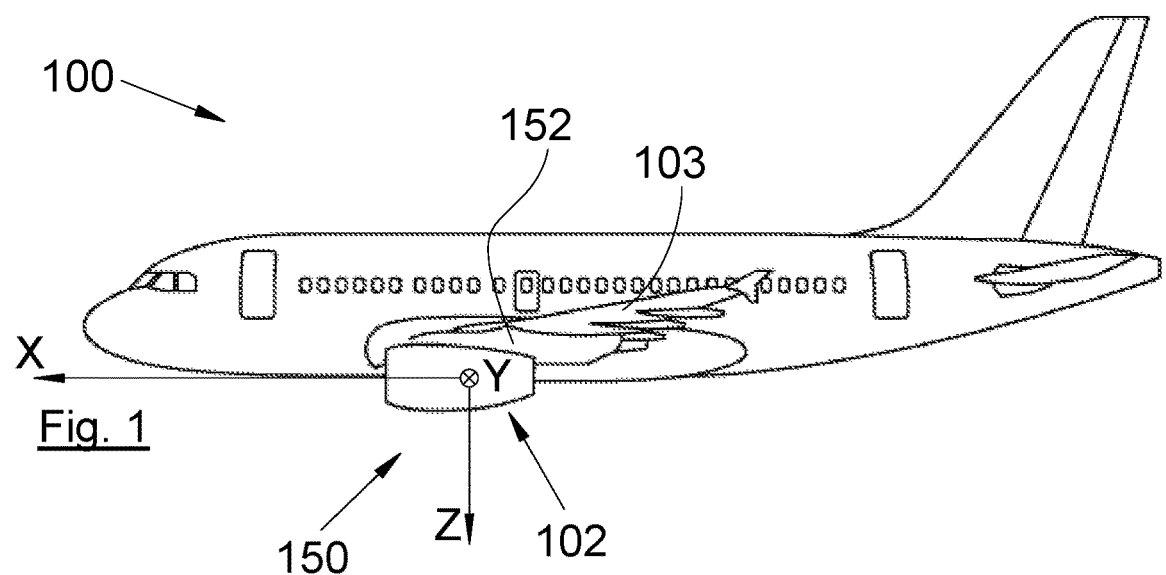
FIG. 1 is a side view of an aircraft according to the invention.

In the following description, the terms relating to a position are taken with reference to an aircraft in position of advance that is to say as it is represented in FIG. 1.

FIG. 1 shows an aircraft 100 which has an engine 102, in particular a jet engine.

In the following description, and by convention, X denotes the longitudinal axis of the engine 102 oriented positively in the forward direction of the aircraft 100, Y denotes the transverse direction of the engine 102 which is horizontal when the aircraft is on the ground, and Z denotes the vertical direction or the vertical height when the aircraft is on the ground, these three directions X, Y and Z being mutually orthogonal.

In the embodiment of the invention presented in FIG. 1, the aircraft 100 comprises an engine 102 under each wing 103, but it is possible to provide several engines under each wing 103.

Under each wing 103 and for each engine 102, the aircraft 100 has an engine attachment system 150 which is fixed to the structure of the wing 103 and extends under the wing 103 and supports the front part of the engine 102.

Figure 2:
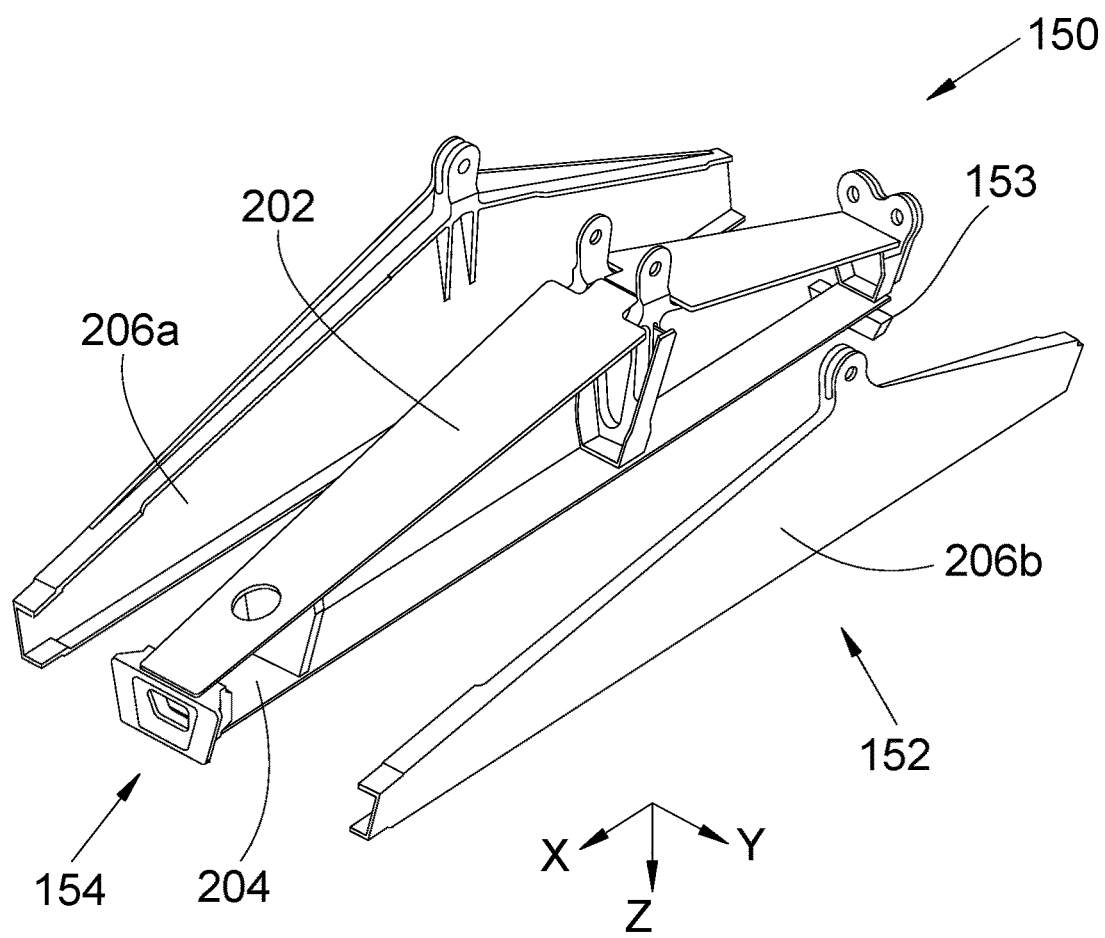
FIG. 2 is an exploded perspective view of an engine pylon according to an embodiment of the invention.
Figure 3:
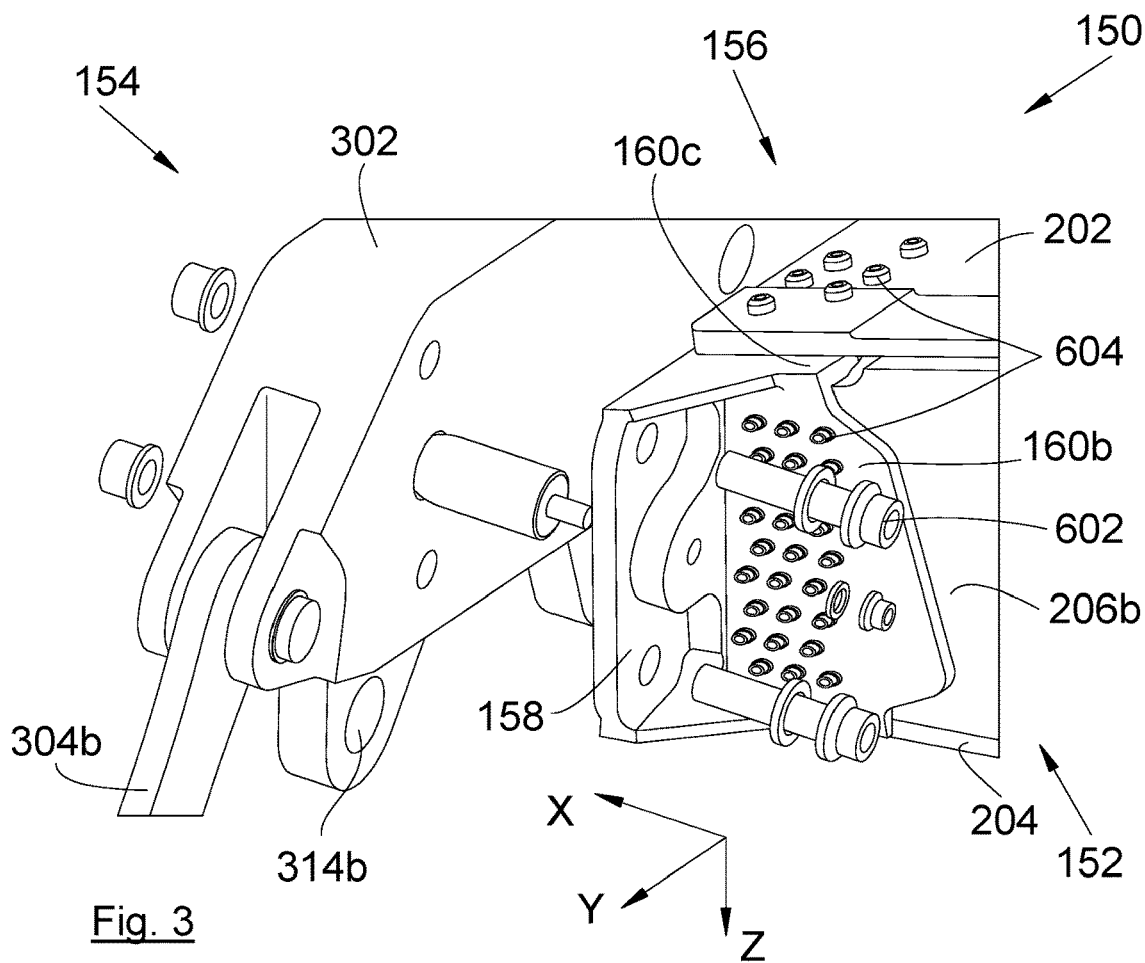
FIG. 3 is a perspective view of an engine attachment system according to the invention, the system comprising an engine pylon and a front engine attachment fixed to the engine pylon via an intermediate piece.
Figure 4:
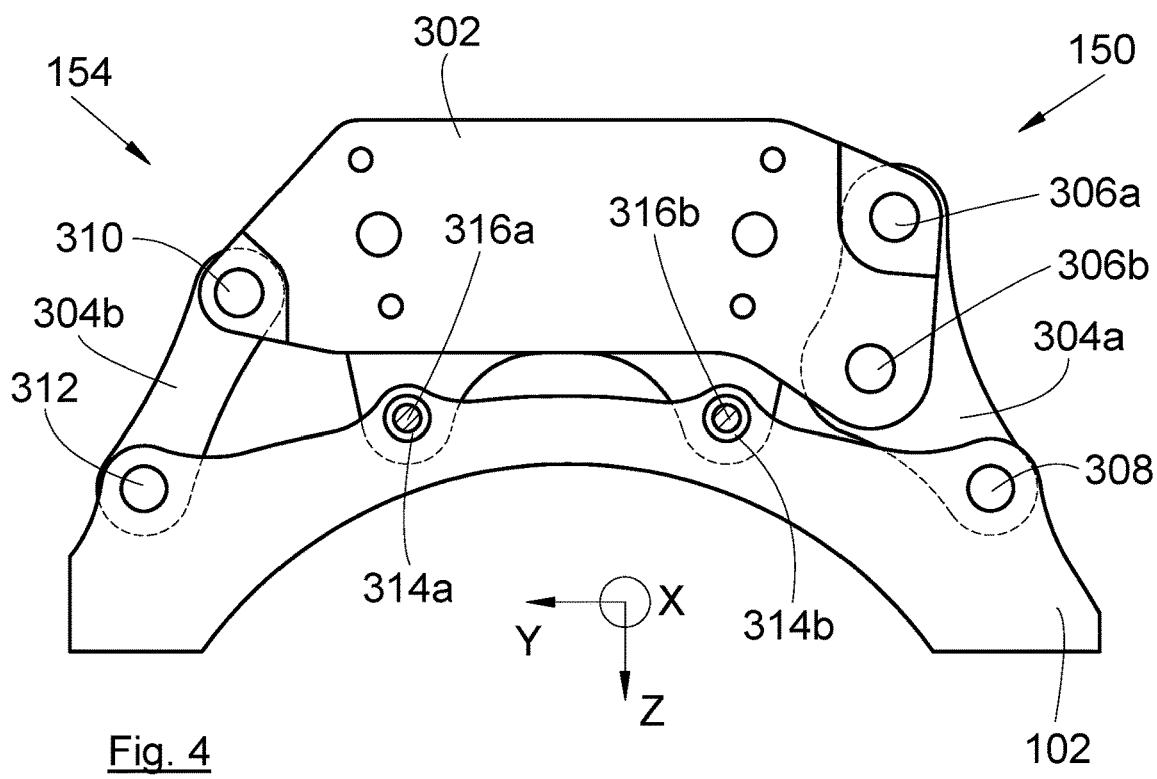
FIG. 4 is a front view of the front engine attachment as represented in FIG. 3, according to an embodiment of the invention.
Figure 5:
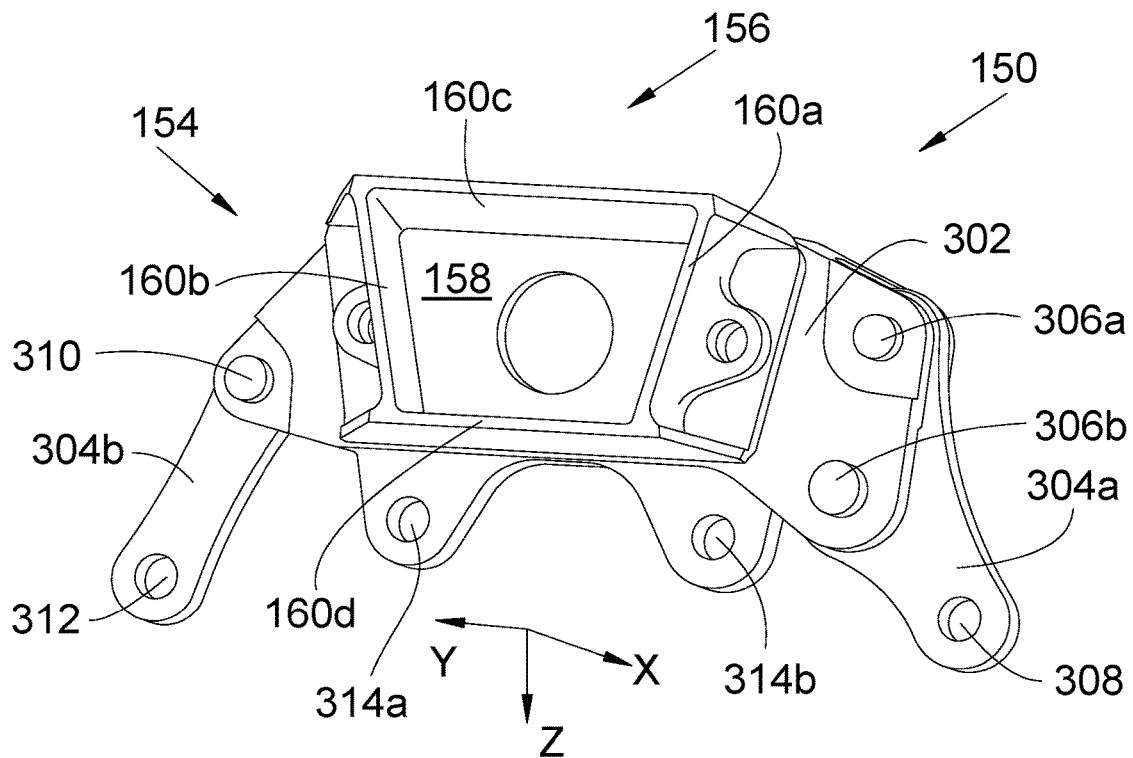
FIG. 5 is a perspective view of a front engine attachment and of an intermediate piece according to an embodiment of the invention.

Referring to FIGS. 2, 3 and 4, the engine attachment system 150 comprises an engine pylon 152 fixed to the wing 103 and a front engine attachment 154 fixed to the engine pylon 152 and to which is fixed the front part of the engine 102, and a rear engine attachment 153 (not described because it does not form part of the invention) fixed to the engine pylon 152 and to which is fixed an intermediate or rear part of the engine 102.

As is known, the engine pylon 152 takes the form of a box which comprises a top wall 202, a bottom wall 204 and, on each side, a lateral wall 206a-b. These various walls 202, 204 and 206a-b are fixed to one another to form the engine pylon 152.

The engine pylon 152 has, in its front part, a front-end face which is delimited by the different walls 202, 204 and 206a-b of the engine pylon 152 and which extends in a substantially vertical plane.

Referring to FIGS. 3 and 4, the front engine attachment 154 comprises a beam 302 to which is fixed, on either side of a median plane XZ, a connecting rod 304a-b.

Each connecting rod 304a-b is fixed in an articulated manner by one of its ends to the beam 302 and is fixed in an articulated manner by the other of its ends to a front part of the engine 102.

According to the invention, the engine attachment system 150 also comprises an intermediate piece 156 which takes the form of a cup with a bottom wall 158 and four lateral walls 160a-d which extend around the bottom wall 158.

Referring to FIG. 3, the beam 302 is fixed against an outer face of the bottom wall 158, here using bolts 602. The outer face of the bottom wall 158 is the face which is oriented towards the front of the aircraft 100.

The intermediate piece 156 is fitted at the front-end face of the engine pylon 152 in such a way that an inner face of the bottom wall 158 comes against the front-end face of the engine pylon 152, that a lateral wall 160a of the intermediate piece 156 comes to bear against a lateral wall 206a of the engine pylon 152, that another lateral wall 160b of the intermediate piece 156 comes to bear against the other lateral wall 206b of the engine pylon 152, that another lateral wall 160c of the intermediate piece 156 comes to bear against the top wall 202 of the engine pylon 152, and that another lateral wall 160d of the intermediate piece 156 comes to bear against the bottom wall 204 of the engine pylon 152.

The inner face of the bottom wall 158 is the face opposite the outer face, that is to say the face which is oriented towards the rear of the aircraft 100.

Each lateral wall 160a-d of the intermediate piece 156 is parallel to the associated wall 202, 204, 206a-b of the engine pylon 152.

Each lateral wall 160a-d of the intermediate piece 156 and the associated wall 202, 204, 206a-b of the engine pylon 152 are fixed to one another, here using bolts 604.

Such an arrangement makes it possible to dispose the beam 302 in the front part of the engine pylon 152, hence a space saving compared to a position under the engine pylon 152. Furthermore, the particular form of the intermediate part 156 makes it possible to guarantee a good rigidity of the front part of the engine pylon 152 and the good transmission of the forces from the beam 302 to the engine pylon 152.

Figures 6, 7:
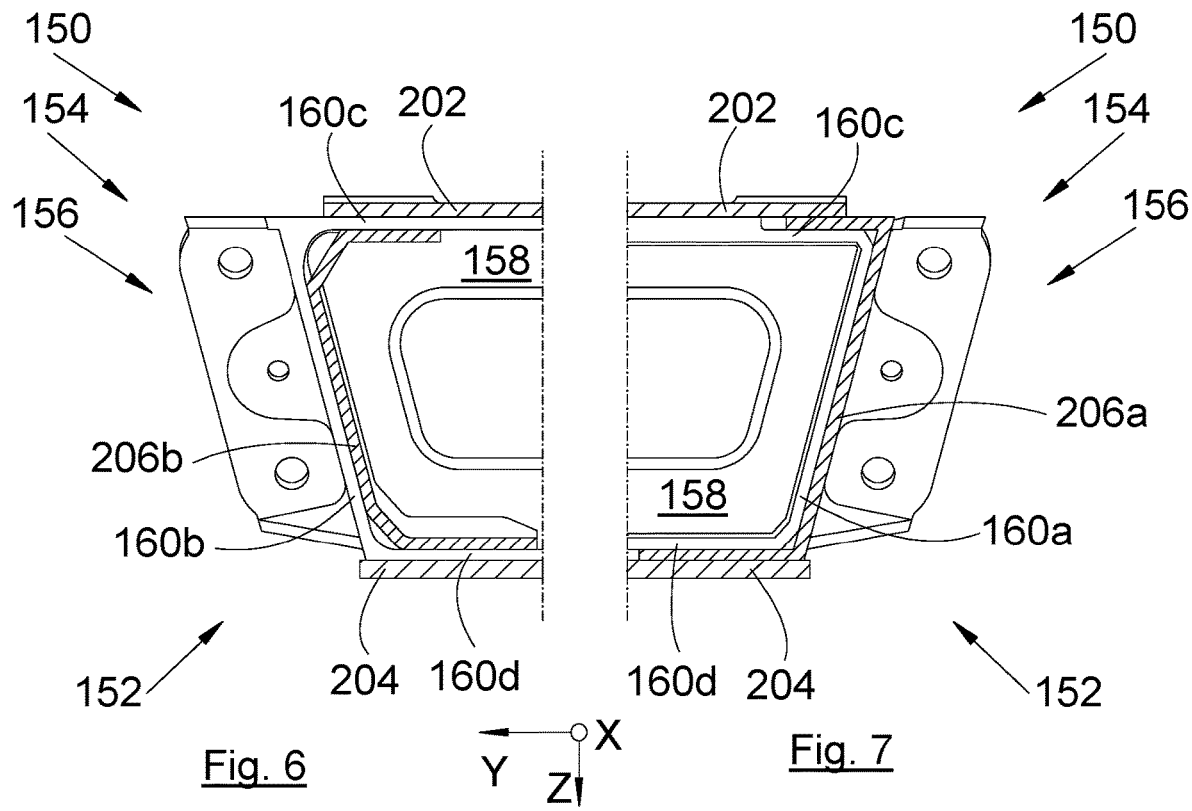
FIG. 6 is a rear and cross sectional view of the intermediate piece according to a first embodiment of the invention.
FIG. 7 is a rear and cross-sectional view of the intermediate piece according to a second embodiment of the invention.

FIG. 6 shows a first particular assembly of the intermediate piece 156 on the engine pylon 152 and FIG. 7 shows a second particular assembly of the intermediate piece 156 on the engine pylon 152.

In the first assembly and the second assembly, each lateral wall 206a-b of the engine pylon 152 takes the form of a U that is open towards the interior of the engine pylon 152. Each lateral wall 206a-b of the engine pylon 152 thus comprises a bottom which constitutes the lateral wall, a first turned edge which extends parallel to the top wall 202 and a second turned edge which extends parallel to the bottom wall 204.

In the first assembly, each lateral wall 206a-b of the engine pylon 152 is positioned inside the cup, that is to say between the lateral walls 160a-d of the intermediate piece 156, whereas the top wall 202 and the bottom wall 204 are pressed on the outside against the lateral walls 160c-d of the intermediate piece 156.

In the second assembly, each lateral wall 206a-b of the engine pylon 152 is positioned on the outside of the cup, that is to say on the outside of the lateral walls 160a-d of the intermediate piece 156, whereas the top wall 202 is pressed on the outside against the lateral wall 160c of the intermediate piece 156 and the first turned edge, and the bottom wall 204 is pressed on the outside against the second turned edge.

In this embodiment, the first turned edge is shorter than half of the lateral wall 160c of the facing intermediate piece 156 to allow the top wall 202 to be brought to bear against both the first turned edge and the lateral wall 160c of the intermediate piece 156.

In the embodiment of the invention presented here, the first connecting rod 304a is fixed by two link points 306a-b to the beam 302 and by one link point 308 to the engine 102, and the second connecting rod 304b is fixed by one link point 310 to the beam 302 and by one link point 312 to the engine 102.

For each connecting rod 304a-b, each link point to the beam 302 and to the engine 102 is composed of a yoke joint produced, respectively in the beam 302 and the engine 102, by a bore passing through the connecting rod 304a-b and by a shearing axis, for example singular, which passes through the yoke joint and is fitted into the bore of the connecting rod through a ball joint link.

Each connecting rod 304a-b, the beam 302, and the intermediate piece 156 together define a primary path for forces between the engine 102 and the engine pylon 152 to withstand the loads of the engine 102 in normal conditions of operation of the engine 102.

For better safety, the front engine attachment 154, and more particularly the beam 302, comprises, for each connecting rod 304a-b, an additional link point 314a-b. The additional link points 314a-b are disposed on either side of the median plane XZ, and each ensures an additional link between the beam 302 and the engine 102. Each additional link point 314a-b takes the form of a waiting fail-safe fixing point which will compensate for a failure of the primary path for forces, that is to say of at least one of the connecting rods 304a-b. That is to say that, when a component of the primary path for forces is damaged, the activation of a waiting fail-safe fixing point creates an auxiliary path for forces between the engine 102 and the engine pylon 152.

The provision of two waiting fail-safe fixing points 314a-b makes it possible to ensure better safety, and the placement of each of them on either side of the median plane XZ makes it possible to distance the waiting fail-safe fixing points 314a-b from the median plane, which facilitates access by a technician to each of these waiting fail-safe fixing points 314a-b. In effect, when there is only one waiting fail-safe fixing point, it is situated in the median plane XZ, that is to say, here, just below the engine pylon 152 which is particularly difficult to access.

Each waiting fail-safe fixing point 314a-b comprises, for example, a yoke joint produced in the engine 102 and of an axis 316a-b fitted into the yoke joint and which passes through a bore of the beam 302 whose diameter is greater than the diameter of the axis 316a-b. Thus, in normal operation, there is no contact between the axis 316a-b and the beam 302, and in the case of the breaking of one of the connecting rods 304a-b, the engine 102 will be displaced and the axis 316a-b then comes into contact with the beam 302.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine attachment system for an engine of an aircraft, the engine attachment system comprising:
   an engine pylon comprising a top wall, a bottom wall and, on each side, a lateral wall, which together delimit a front-end face in a front part of the engine pylon, and
   a front engine attachment comprising a beam to which is fixed, on either side of a median plane, a connecting rod, where each connecting rod is fixed in an articulated manner by a first end to the beam and is configured to be fixed in an articulated manner by a second end to the engine,
   an intermediate piece which is formed as a cup with a bottom wall and four lateral walls which extend around the bottom wall,
   the beam being fixed against an outer face of the bottom wall,
      wherein the intermediate piece is fitted at the front-end face of the engine pylon in such a way that an inner face of the bottom wall comes against the front-end face of the engine pylon,
      wherein a lateral wall of the intermediate piece comes to bear against a lateral wall of the engine pylon,
      wherein another lateral wall of the intermediate piece comes to bear against another lateral wall of the engine pylon,
      wherein another lateral wall of the intermediate piece comes to bear against the top wall of the engine pylon,
      wherein another lateral wall of the intermediate piece comes to bear against the bottom wall of the engine pylon, and
      wherein each lateral wall of the intermediate piece and an associated wall of the engine pylon are fixed to one another,
   wherein each lateral wall of the engine pylon is formed as a U that is open towards the interior of the engine pylon and comprising a bottom which constitutes the lateral wall, a first turned edge which extends parallel to the top wall and a second turned edge which extends parallel to the bottom wall,
   wherein the top wall is pressed on the outside against the lateral walls of the intermediate piece.

2. The engine attachment system according to claim 1, wherein each lateral wall of the engine pylon is positioned between the lateral walls of the intermediate piece, and the bottom wall is pressed on the outside against the lateral walls of the intermediate piece.

3. The engine attachment system according to claim 1, wherein each lateral wall of the engine pylon is positioned on an outside of the lateral walls of the intermediate piece, wherein the top wall is pressed on the outside against the lateral wall of the intermediate piece and the first turned edge, and wherein the bottom wall is pressed on the outside against the second turned edge.

4. The engine attachment system according to claim 1, wherein each connecting rod, the beam and the intermediate piece together define a primary path for forces between the engine and the engine pylon to withstand loads of the engine, and wherein, there comprises for each connecting rod, a waiting fail-safe fixing point activated in case of failure of the primary path for forces and which creates an auxiliary path for forces between the engine and the engine pylon, and wherein the two waiting fail-safe fixing points are disposed on either side of the median plane.

5. The engine attachment system according to claim 4, wherein each waiting fail-safe fixing point comprises a yoke joint produced in the engine and an axis fitted into said yoke joint and which passes through a bore of the beam whose diameter is greater than a diameter of the axis.

6. An aircraft comprising a structure, an engine and an engine attachment system according to claim 1, wherein the engine pylon is fixed to the structure, and wherein a front part of the engine is fixed to said second ends of the connecting rods.

\* \* \* \* \*